(12) United States Patent
Jeon

(10) Patent No.: US 6,747,932 B1
(45) Date of Patent: Jun. 8, 2004

(54) APPARATUS AND METHOD FOR DETECTING NON-RECORDING REGIONS OF AN OPTICAL RECORDING MEDIUM

(75) Inventor: Hyung Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 705 days.

(21) Appl. No.: 09/612,544

(22) Filed: Jul. 7, 2000

(30) Foreign Application Priority Data

Jul. 9, 1999 (KR) ........................................ 1999-27777

(51) Int. Cl.[7] ................................................ G11B 7/00
(52) U.S. Cl. .................................. 369/53.24; 369/47.22
(58) Field of Search ........................ 369/47.22, 47.28, 369/47.3, 53.24, 53.35, 53.36, 53.28, 59.19

(56) References Cited

U.S. PATENT DOCUMENTS

| | | | | |
|---|---|---|---|---|
| 6,088,307 A | * | 7/2000 | Fushimi et al. | 369/44.13 |
| 6,091,700 A | * | 7/2000 | Kobayashi | 369/275.4 |
| 6,181,655 B1 | * | 1/2001 | Gushima | 369/47.31 |
| 6,324,136 B1 | * | 11/2001 | Yoshida et al. | 369/47.22 |
| 6,333,902 B1 | * | 12/2001 | Shim | 369/47.54 |
| 6,459,661 B1 | * | 10/2002 | Iwanaga | 369/44.26 |

FOREIGN PATENT DOCUMENTS

| JP | 10-247325 | 9/1998 |
|---|---|---|
| JP | 10-320783 | 12/1998 |
| JP | 11-120564 | 4/1999 |
| JP | 11-162108 | 6/1999 |
| JP | 2000-030270 | 1/2000 |

* cited by examiner

Primary Examiner—W. R. Young
Assistant Examiner—Michael Battaglia
(74) Attorney, Agent, or Firm—Birch, Stewart, Kolasch & Birch, LLP

(57) ABSTRACT

The present invention relates to an apparatus and method for detecting non-recording regions of an optical recording medium for recording data or reproducing the recorded data by detecting header regions of the optical recording medium. For this purpose, in the apparatus for detecting non-recording regions of the optical recording medium having a plurality of header regions of different phases arranged between writable data regions in which the information capable of recognizing a reference frequency is wobbled on tracks, in order to distinguish the data regions by their shapes, the apparatus for detecting non-recording regions of the optical recording medium in accordance with the present invention includes a header region detection unit for detecting the plurality of header regions, a header region verification unit for verifying the detected header regions and outputting verified signals, a wobble-PLL unit for outputting PLL-wobble signals by phase locking upon receipt of wobble signals recorded on the tracks of the optical recording medium, and a counter for outputting header mask signals by counting the number of output pulses of the wobble-PLL unit upon receipt of the PLL-wobble signals on the basis of the verified signals.

15 Claims, 4 Drawing Sheets

FIG. 4B  IP1
FIG. 4C  IP2
FIG. 4D  IP1ext
FIG. 4E  IP2ext
FIG. 4F  IPand
FIG. 4G  HEAD MASK
FIG. 4H  PLL-WOBBLE

APPARATUS AND METHOD FOR DETECTING NON-RECORDING REGIONS OF AN OPTICAL RECORDING MEDIUM

BACKGROUND OF THE INVENTION

1. Field of the Invention

The present invention relates to an apparatus and method for detecting non-recording regions of an optical recording medium, and more particularly, to an apparatus and method for detecting non-recording regions of an optical recording medium for recording data or reproducing the recorded data by detecting header regions of the optical recording medium.

2. Description of the Background Art

Generally, an optical recording/reproducing apparatus records or reproduces data on an optical recording medium such as a CD (Compact Disc), DVD-RAM (Digital Versatile Disc-Random Access Memory), etc. The above-mentioned optical recording medium has a track structure consisting of a land and groove. Particularly, a rewritable optical recording medium such as the DVD-RAM records data signals on the land and groove, respectively, in order to increase data recording density. To record data on the land and groove, the optical recording/reproducing apparatus must reduce the size of a laser beam spot for recording and reproducing data by decreasing the wavelength of a laser light outputted from an optical pickup and increasing the numerical aperture of an objective lens of the optical pickup.

FIG. 1 is a block diagram of a general optical recording/reproducing apparatus, wherein an optical recording medium for recording data on a land and groove is mounted on a drive of the above optical recording/reproducing apparatus.

To record or reproduce data on the optical recording medium, optical pickup 102 is operated by control of servo control unit 106 through focus servo driving unit 107 and tracking servo driving unit 108, and accordingly outputs laser beams onto a signal recording surface of the optical recording medium 101 on which data is recorded. When the light reflected from the signal recording surface of the optical recording medium is incident on the optical pickup again, the optical detector installed in the optical pickup outputs electric signals to the RF and servo error generating unit 104.

RF and servo error generating unit 104 outputs focus error signals, tracking error signals, and RF signals (lead channel 1 signals) upon receipt of the electrical signals. Herein, the focus error signals (FE) and the tracking error signals (TF) (lead channel 2 signal) are generated from the electric signals outputted from the optical detector comprised of a plurality of optical detection devices.

The lead channel signals 1 outputted from RF and servo error generating unit 104 are outputted to decoder 105, and the FE signals and TE signals are outputted to servo control unit 106. Namely, decoder 105 restores the RF signals to the original data when it reproduces the data recorded on the optical recording medium.

Encoder 103 receives data to be recorded on the optical recording medium. That is, encoder 103 encodes the data to be recorded using recording pulses appropriate to the type of optical recording medium 101, and thereafter records the encoded data on optical recording medium 101 through optical pickup 102.

Meanwhile, the above-described optical recording/reproducing apparatus can be connected to a host such as a PC. In the optical recording/reproducing apparatus connected to the host, when a recording/reproducing command transmitted from the host through interface 110 is inputted to microcomputer 111, the data to be recorded on optical recording medium 101 is transmitted to encoder 103 to thus be recorded on optical recording medium 101 by control of microcomputer 111, and the data outputted from optical recording medium 101 is transmitted from decoder 105, for thereby reproducing the data recorded on optical recording medium 101.

Servo control unit 106 outputs control signals to focus servo driving unit 107 and tracking servo driving unit 108, respectively, upon receipt of the focus error signals (FE) and tracking error signals (TE). Focus servo driving unit 107 drives a focus actuator in optical pickup 102 to move optical pickup 102 upwardly and downwardly, and makes beams outputted from optical pickup 102 to follow tracks of optical recording medium 101 as optical recording medium 101 is rotated and at the same time moved upwardly and downwardly, being focused on the track of optical recording medium 101. In addition, tracking servo driving unit 108 drives a tracking actuator in optical pickup 102 to move the objective lens of optical pickup 102 in the radial direction, thereby correcting the position of the beams and following the tracks.

Meanwhile, in the case of optical recording medium 101 such as DVD-RAM which is directly delivered from its manufacturer and has no information recorded, the optical recording/reproducing apparatus cannot record any data on optical recording medium 101 because optical pickup 102 cannot access optical recording medium 101. Therefore, in order to record data on optical recording medium 101, optical recording medium 101 must have land and groove tracks. On optical recording medium 101 having the above tracks, control information for sector addressing, random access, and rotation control is recorded along with the tracks on which data is recorded, being separated from the above-mentioned data to be recorded, thus making it possible to control the tracking of optical recording medium 101 having no recorded data thereon. Namely, the above-mentioned control information can be recorded by pre-formatting header regions on the starting position of each sector or by forming wobble along with the tracks.

Here, the above-mentioned wobble is information recorded on the optical recording medium by modulating certain clocks, including the information on the corresponding position and rotational speed of the optical recording medium, which is analyzed by optical power detected by a laser diode of the optical pickup.

FIG. 2(*a*) is a view illustrating a header region pre-formatted on the starting position of each sector of the optical recording medium, said header region having four header fields (header 1 field~header 4 field).

The header 1 and 2 fields and the header 3 and 4 fields are arranged in a staggered fashion with each other from the center of the tracks. The phase of the header 1 and 2 fields is opposite to that of the header 3 and 4 fields, and also the phase of tracking error signals detected from the header 1 and 2 fields is opposite to that of tracking error signals detected from the header 3 and 4 fields. The track interface of regions whose data is recorded on the optical recording medium is, as illustrated in FIG. 2(*a*), formed in a wobble shape.

In the structure of the header region of the optical recording medium described above, servo error signals such as tracking error signals and focus error signals are generated.

That is, the servo error signals read out from the header regions are distorted according to the structure of the header regions, and it is difficult to control the distorted servo error signals.

Therefore, in the case of optical recording medium such as DVD-RAM, the servo of the optical recording/reproducing apparatus is performed so that the servo error signal is held in the header regions, in order to reduce the influence on the servo error signals according to the header structure. That is, in the header region section, the beams outputted from the optical pickup are made not to deviate from the center of the tracks of the optical recording medium by covering the header regions with header masks and holding the tracking error signals For this purpose, it must be firstly judged that the information reproduced by the optical recording apparatus belongs to the header regions of the optical recording medium. The header regions are judged by using wobble signals detected from lead channel 2 signals and IP1 or IP2 signals. Herein, since the number of wobble signals existing on each sector is always constant, header mask signals are generated by counting the number of the wobble signals. At this time, the wobble signals may not be detected well because of defects of the optical recording medium. Thus, as illustrated in FIG. 2(e), header mask signals are generated by counting the number of clocks that are phase-locked on the wobble signals actually recorded on the optical recording medium, that is, the number of PLL-wobble signals.

As illustrated in FIG. 2(d), the rising timing of the header mask signal is determined by counting the number of PLL-wobble signals as illustrated in FIG. 2(e) from the falling timing of the previous header mask signal, and, as illustrated in FIGS. 2(b) and 2(c), the falling timing of the header mask signal is determined by using IP1 or IP2 signals.

At this time, since the header 1 and 2 fields and the header 3 and 4 fields are arranged in a staggered fashion with each other from the center of the tracks of the optical recording medium, the phase (slope) of lead channel 2 signals detected from the header 1 and 2 fields is opposite to that of lead channel 2 signals detected from the header 3 and 4 fields. If the lead channel 2 signal of the header region is above the center of the track, it is outputted to a IP1 signal waveform as illustrated in FIG. 2(b) and, if it is below the center of the track, it is outputted to a IP2 signal waveform as illustrated in FIG. 2(c).

When data is recorded/reproduced on the optical recording medium, the phase is changed to the above IP1 signal or IP2 signal according to whether the currently followed track is a land or a groove. That is, either IP1 signal or IP2 signal is firstly outputted according to whether the track is a land or a groove. At this time, the falling timing of the header mask signal can be determined by ORing the above IP1 signal and IP2 signal. The lead channel 2 signal is detected when both tracking servo and focus servo are ON because the servo of the optical recording/reproducing apparatus is stably performed.

If the tracking servo is in the traverse state or free-running state, the servo of the optical recording/reproducing apparatus is unstable. Thus, the lead channel 2 signal is not detected, and accordingly the IP1 or IP2 signal is also not detected. Subsequently, if there are no IP1 and IP2 signals which are used as reference signals, the header regions are not properly detected and accordingly the servo error signals cannot be held in the header region, whereby the servo error signals are more influenced by the header regions.

In this way, when the IP1 or IP2 signal is used for measuring the traverse or eccentric amount for seeking by holding the header regions, the servo error signals are distorted because free running occurred due to the header regions.

If the tracking error signals cannot be held in the header regions, the tracking error signals become larger and the actuator follows the header regions. If the actuator follows the header regions, track slippage occurs thereby making the track servo unstable due to discrete track error variation and degrading the characteristics of recording/reproducing data on the optical recording medium.

SUMMARY OF THE INVENTION

Accordingly, it is an object of the present invention to provide an apparatus and method for detecting non-recording regions of an optical recording medium for recording or reproducing data by precisely detecting header regions of the optical recording medium even in the case that a servo is unstable.

For this purpose, in the apparatus for detecting non-recording regions of the optical recording medium having a plurality of header regions of different phases arranged between writable data regions in which the information capable of recognizing a reference frequency is wobbled on tracks, in order to distinguish the data regions by their shapes, the apparatus for detecting non-recording regions of the optical recording medium in accordance with the present invention includes a header region detection unit for detecting the plurality of header regions, a header region verification unit for verifying the detected header regions and outputting verified signals, a wobble-PLL unit for outputting PLL-wobble signals by phase locking upon receipt of wobble signals recorded on the tracks of the optical recording medium, and a counter for outputting header mask signals by counting the number of output pulses of the wobble-PLL unit upon receipt of the PLL-wobble signals on the basis of the verified signals.

In the method for detecting non-recording regions of the optical recording/reproducing apparatus having a plurality of header regions of different phases arranged between writable data regions in which the information capable of recognizing a reference frequency is wobbled on tracks, in order to distinguish the data regions by their shapes, the method for detecting non-recording regions of the optical recording medium in accordance with the present invention includes a step of generating first header detection signals and second header detection signals by generating control signals by using optical reflection signals from the optical recording medium and slicing the control signals to a set slice level, a step of generating a verification signal for determining header mask regions by using the first and second header detection signals, and a step of determining the "on" time point of the header mask signal representing a header region by counting the number of PLL-wobble signal generated by locking a phase lock loop (PLL) on the wobbling signals and determining the "off" time point of the header mask signal by using the verification signal as the reference signal.

BRIEF DESCRIPTION OF THE DRAWINGS

The present invention will become better understood with reference to the accompanying drawings which are given only by way of illustration and thus are not limitative of the present invention, wherein:

FIGS. 4(a) through 4(h) are timing diagrams illustrating the process of generating a header mask in accordance with the present invention.

DETAILED DESCRIPTION OF THE PREFERRED EMBODIMENTS

Figure 1:
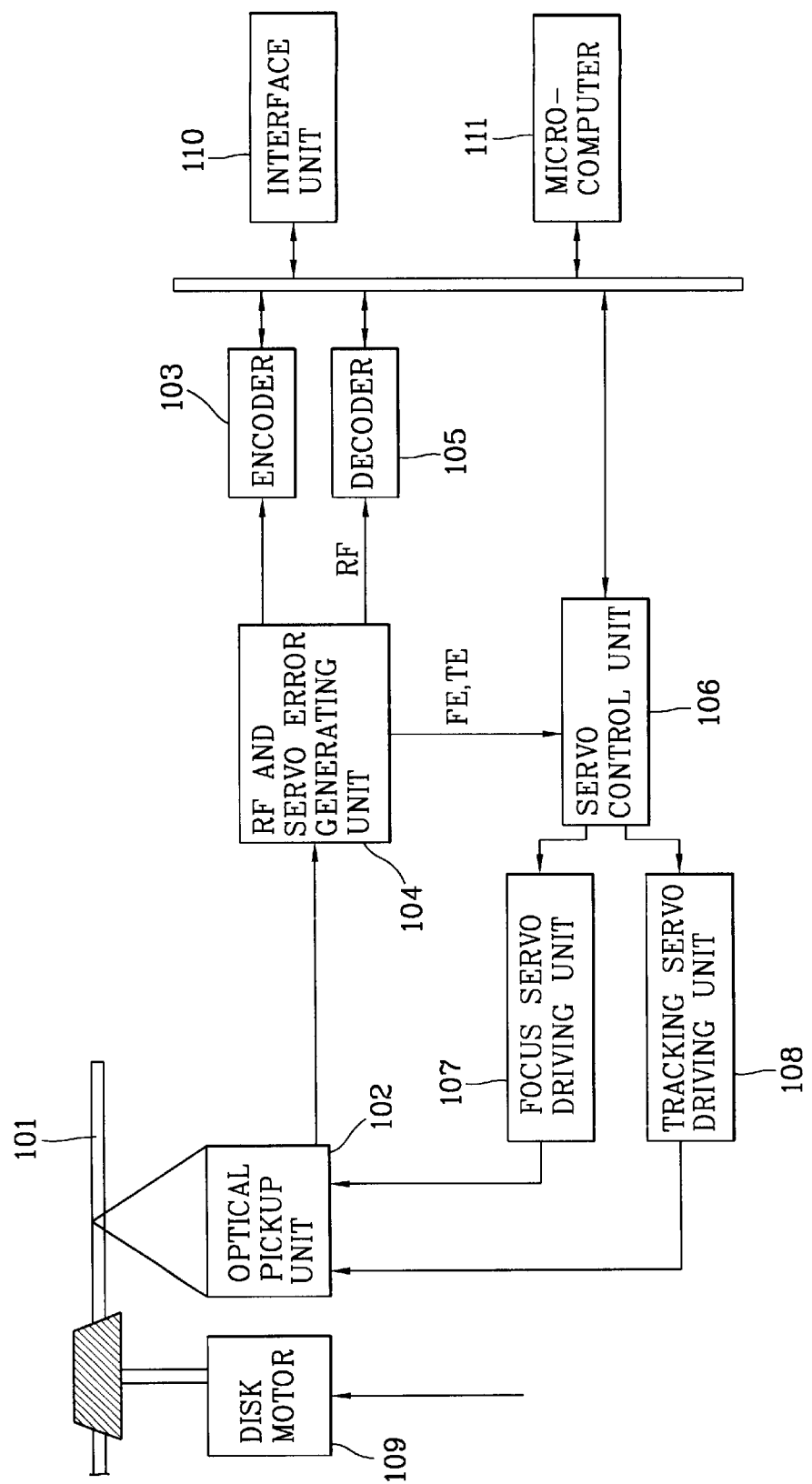
FIG. 1 is a block diagram of a general optical recording/reproducing apparatus.
Figure 2:
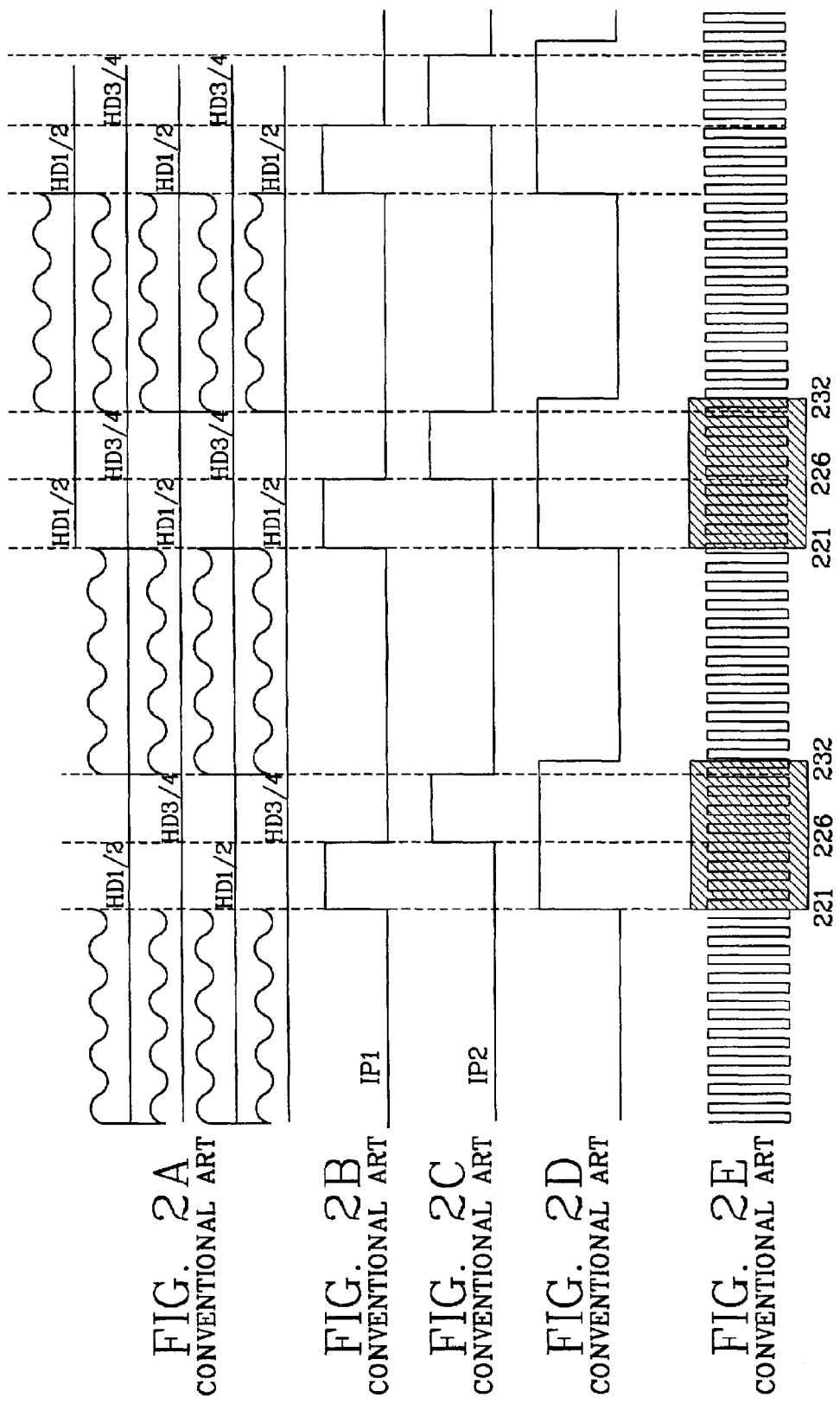
FIGS. 2(a) through 2(e) are timing diagrams illustrating the process of generating a header mask in accordance with the conventional art.
Figure 3:
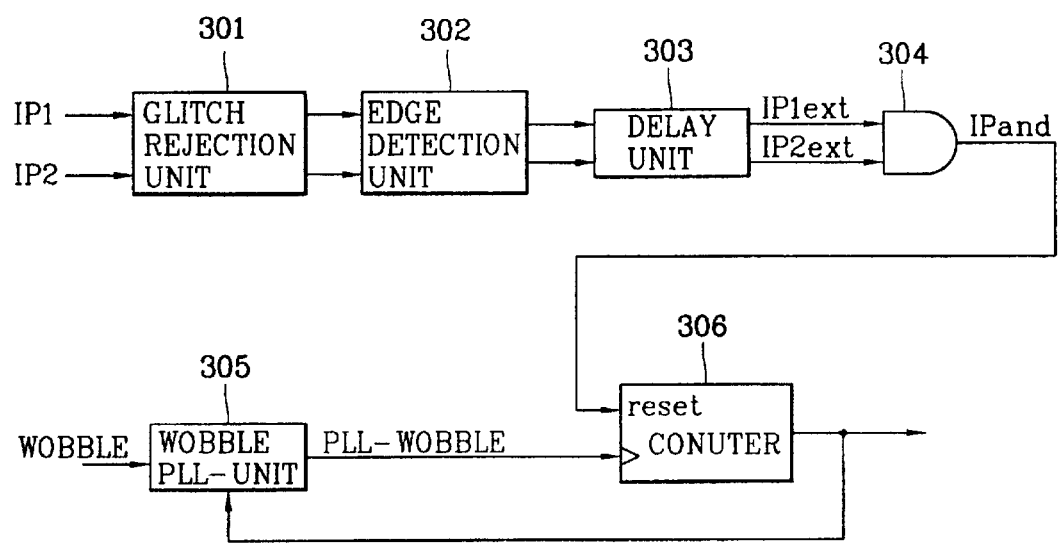
FIG. 3 is a block diagram of an apparatus for detecting non-recording regions of an optical recording medium in accordance with the present invention.

FIG. 3 is a block diagram of an apparatus for detecting non-recording regions of an optical recording medium in accordance with the present invention which includes: glitch rejection unit 301 for removing a glitch upon receipt of IP1 and IP2 signals generated by slicing a lead channel 2 signal; edge detection unit 302 for detecting the rising edge of the IP1 and IP2 signals from which the glitch is rejected; delay unit 303 for delaying the signal in which the rising edge is detected for a predetermined time; AND gate 304 for ANDing the IP1 signal and IP2 signal delayed in delay unit 303; wobble-PLL unit 305 (also referred to as PLL-wobble unit) for outputting PLL-wobble signals by phase locking upon receipt of wobble signals recorded on the tracks; and counter 306 for generating header mask signals by counting the number of PLL-wobble signals upon receipt of signals outputted from AND gate 304 and the PLL-wobble signal.

The operational procedure of the apparatus for detecting non-recording regions of the optical recording medium in accordance with the present invention thusly constructed will now be described.

Figure 4A:
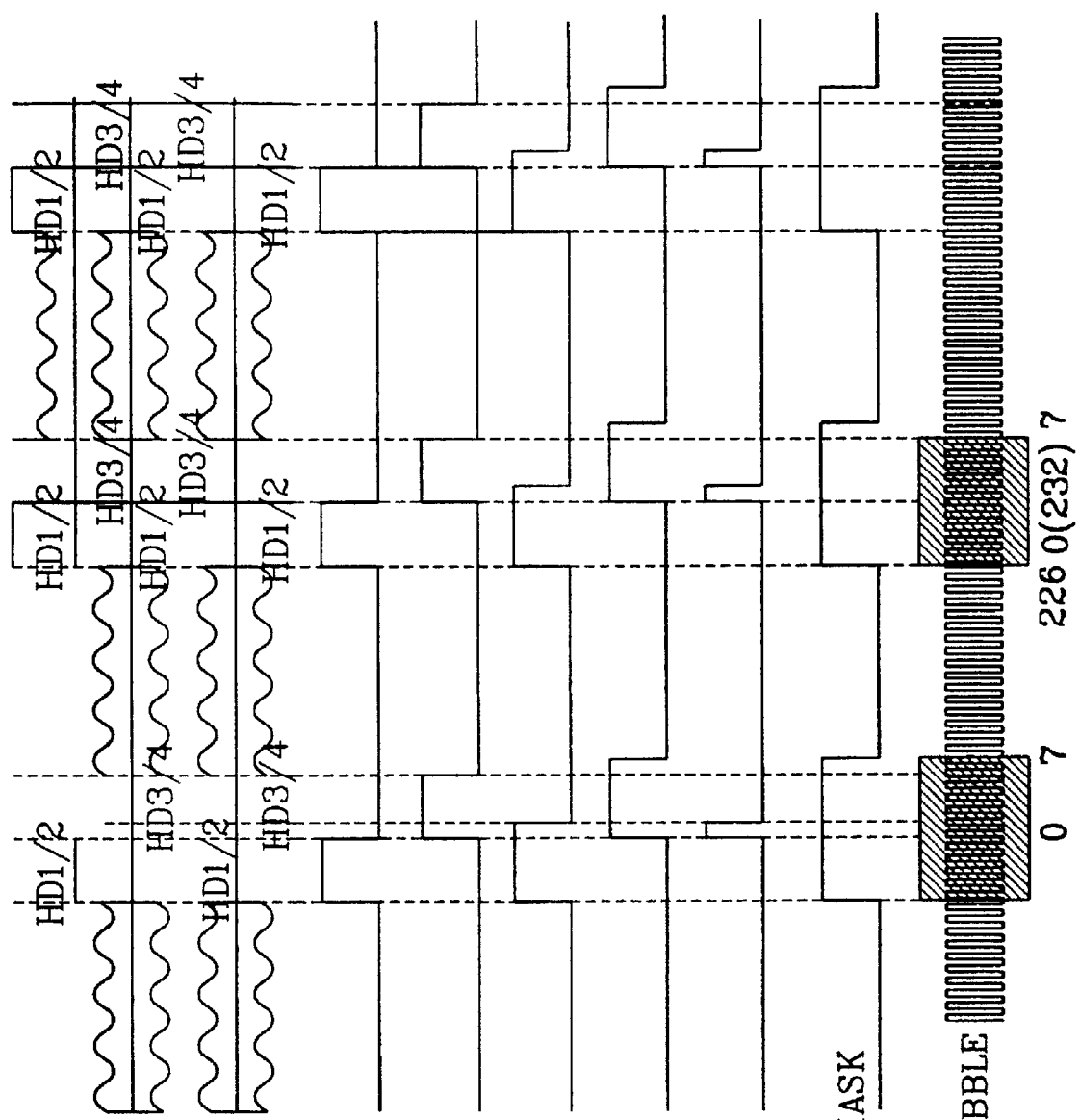

RF and servo error control unit (not shown) generates IP1 and IP2 signals, as illustrated in FIGS. 4(b) and 4(c), upon receipt of electric signals inputted from an optical pickup, by slicing the lead channel 2 signal of header 1 and 2 fields and header 3 and 4 fields to a slice level, as illustrated in FIG. 4(a). The slice level is preferably set to a tracking zero cross (TZC) position.

The above-mentioned IP1 and IP2 signals have so much noise that they are inputted to edge detection unit 302 after rejecting waveforms of less than a certain period from glitch rejection unit 301. Once edge detection unit 302 detects the rising edges of the IP1 and IP2 signals and outputs them to delay unit 303, delay unit 303 outputs IP1ext and IP2ext signals which is longer than the original signal by delaying the IP1 and IP2 signals in a high level state. That is, when the rising edge of the IP1 signal is detected in edge detecting unit 302, delay unit 303 delays the IP1 signal in a high level state for a predetermined time from the rising edge of the IP1 signal. At this time, the time delayed by delay unit 303 is set to be longer as compared to the original IP1 signal.

The IP2 signal is processed by the same process as the IP1 signal, as explained above.

AND gate 304 outputs IPand signals to counter 306, as illustrated in FIG. 4(f), by ANDing IP1ext and IP2ext signals outputted from delay unit 303, as illustrated in FIGS. 4(d) and 4(e).

Meanwhile, wobble-PLL unit 305 that has received wobble signals recorded on the tracks of the optical recording medium at a predetermined frequency outputs PLL-wobble signals, as illustrated in FIG. 4(h). That is, although the number of wobble signals existing on each sector is constant, the wobble signals may not be detected due to defects of the optical recording medium. Thus, the PLL-wobble signals generated by phase locking the wobble signals actually recorded on the optical recording medium are outputted to the clock terminal of counter 306 (counter 306 uses the PLL-wobble signals as clock signals.).

Since there is no wobble signal recorded in the header regions, The PLL-wobble signals are held at the previous value so that they freely run to the previous frequency. That is, wobble or slippage occurs in the header regions. Because the PLL-wobble signals are delayed when the wobble signals are phase-locked, a header mask signal is delayed longer as compared to the actual position of the header region.

To prevent the above-mentioned problems, wobble-PLL unit 305 gets feedback from the output signals of counter 306, and it holds the PLL-wobble signals at the previous value when the signals outputted from counter 306 represent header regions.

Herein, counter 306 is reset to 0 the moment IPand signals outputted from AND gate 304 rises to a high level, and perform counting by using the phase-locked wobble signal as a clock. When the number of PLL-wobble signals reaches a certain number of preset pulse signals while counter 306 counts the number of PLL-wobble signals, counter 306 judges them header regions, and continues counting the number of PLL-wobble signals after transiting the header mask signal to a high level, as illustrated in FIG. 4(g).

Counter 306 is reset to 0 upon receipt of IPand signals of high level outputted from AND gate 304, and thereafter starts counting again. When the number of the counted PLL-wobble signals reaches a certain number of preset pulse signals, counter 306 continues counting the number of PLL-wobble signals after transiting the header mask signal to a low level.

In the embodiment of the present invention, if the count shows 226, the header mask signal is turned into a high level, and then reset by the IPand signal. If the count shows 7, the header mask signal is turned into a low level. Herein, when the reference number of pulse signals for determining the rising/falling timings of the header mask signal is adjusted, the rising/falling timings of the header mask signal is accordingly adjusted.

In the embodiment of the present invention, the length of the header mask signal is formed to be larger than the length of the actual header region.

Meanwhile, the IP1 signal and the IP2 signal may be unstable even if glitch is rejected, because they are the signals generated by slicing the lead channel 2 signal. However, the IPand signal is generated only when the IP1 and IP2 signals are simultaneously generated, so the possibility of the IPand signal being generated exists at the place at which it must not be generated. Particularly, the possibility of generating a header mask signal in a data section becomes lower.

In addition, if none of the IP1 and IP2 signals is generated, the IPand signal may not be generated. At this time, if the count shows 232, the counter 306 is automatically reset, or it is reset at the time when the IPand signal is inputted.

In the embodiment of the present invention, the rising timing of the header mask signal is determined by the count of PLL-wobble signals, and then, if the IPand signal is outputted, the falling timing of the header mask signal is determined by resetting the counter, or, if not, the falling timing of the header mask signal is determined by resetting the counter to the number of counts.

As explained above, in the apparatus and method for detecting non-recording regions of the optical recording medium in accordance with the present invention, the rising timing of the header mask signal is determined by counting the phase-locked wobble signals, and the falling timing of the header mask signal is determined by ANDing the signals generated by delaying the IP1 signal and the IP2 signal detected in the lead channel 2 signal and using the ANDed signals as the reference signals, thus making it possible to generate stable and accurate header mask signals.

Subsequently, by stably masking the header regions, a tracking error does not become serious, track slippage does not occur, and the track servo is made stable in the header regions. In addition, because the servo is stable, data can be stably recorded or reproduced on the optical recording medium.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an apparatus for detecting non-recording regions of an optical recording medium having a plurality of header regions of different phases arranged between writable data regions in which information capable of being recognized as a reference frequency is wobbled on tracks, in order to distinguish the shape of the data region, an apparatus for detecting non-recording regions of an optical recording medium comprising:

a header region detection means for detecting the plurality of header regions;

a header region verification means for verifying the detected header regions and outputting verified signals by delaying each detected signal detected-by the header region detection means for a predetermined time and by ANDing the delayed detection signals;

a PLL-wobble unit for outputting PLL-wobble signals by phase locking upon receipt of wobble signals recorded on the tracks of the optical recording medium; and a counter for outputting header mask signals by counting the number of output pulses of the PLL-wobble unit upon receipt of the PLL-wobble signals on the basis of the verified signals.

2. The apparatus of claim 1, wherein the header region detection means comprises:

a glitch rejection unit for removing a glitch upon receipt of IP1 and IP2 signals generated by slicing a lead channel 2 signal; and an edge detection unit for detecting the rising edge of the IP1 and IP2 signals from which the glitch is rejected.

3. The apparatus of claim 1, wherein the header region verification means comprises:

a delay unit for delaying the signal in which the rising edge is detected; and a logic operator for logically operating focus error signals and tracking error signals delayed in the delay unit.

4. The apparatus of claim 3, wherein the logic operator is an AND gate.

5. In a method for detecting non-recording regions of an optical recording/reproducing apparatus having a plurality of header regions of different phases arranged between writable data regions in which information capable of being recognized as a reference frequency is wobbled on tracks, in order to distinguish the shape of the data region, a method for detecting non-recording regions of an optical recording medium, comprising:

a step of generating first header detection signals and second header detection signals by generating control signals by using optical reflection signals from the optical recording medium and slicing the control signals to a set slice level;

a step of generating a verification signal for determining header mask regions by using the first and second header detection signals; and a step of detecting header regions by counting the number of PLL-wobble signals using the verification signal as the reference signal;

wherein the verification signal is obtained by ANDing the signals generated after delaying the first and second header signals for a predetermined time.

6. The method of claim 5, wherein the control signals are push-pull signals.

7. The method of claim 5, wherein the delayed first and second header detection signals are signals delayed longer as compared to the first and second header detection signals.

8. The method of claim 5, wherein the header mask regions hold the PLL-wobble signals at a previous value in "ON" sections.

9. The method of claim 5, wherein the step of detecting header regions comprises:

a step of turning header mask signal on when the number of the counted PLL-wobble signals reaches a certain number of preset pulse signals;

a step of resetting the counted values to 0 and counting them again when the reference signal is inputted after the header mask signal is turned on; and a step of turning the header mask signal off if the number of counts reaches a certain number of preset pulse signals.

10. The method of claim 9, further comprising a step of resetting the counted values to 0 and counting them again is further comprised if the reference signal is not inputted after the header mask signal is turned on.

11. The method of claim 9, wherein the turning on and turning off of the header mask signal is adjusted by changing the reference number of the preset pulse signals.

12. The method of claim 9, further comprising a step of controlling a servo by holding servo error signals if it is discriminated by the header mask signal that points of the optical recording medium currently recorded/reproduced are header regions.

13. The method of claim 5, wherein the delayed first and second header detection signals are signals delayed longer as compared to the first and second header detection signals.

14. In an apparatus for detecting non-recording regions of an optical recording medium having a plurality of header regions of different phases arranged between writable data regions in which information capable of being recognized as a reference frequency is wobbled on tracks, in order to distinguish the shape of the data region, an apparatus for detecting non-recording regions of an optical recording medium comprising:

a header region detection means for detecting the plurality of header regions;

a header region verification means for verifying the detected header regions and outputting verified signals;

a PLL-wobble unit for outputting PLL-wobble signals by phase locking upon receipt of wobble signals recorded on the tracks of the optical recording medium; and a counter for outputting header mask signals by counting the number of output pulses of the PLL-wobble unit upon receipt of the PLL-wobble signals on the basis of the verified signals, wherein the header region verification means comprises:
   a delay unit for delaying the signal in which the rising edge is detected; and
   a logic operator for logically operating focus error signals and tracking error signals delayed in the delay unit, and wherein the logic operator is an AND gate.

15. In a method for detecting non-recording regions of an optical recording/reproducing apparatus having a plurality of header regions of different phases arranged between writable data regions in which information capable of being recognized as a reference frequency is wobbled on tracks, in order to distinguish the shape of the data region, a method for detecting non-recording regions of an optical recording medium, comprising:
   a step of generating first header detection signals and second header detection signals by generating control signals by using optical reflection signals from the optical recording medium and slicing the control signals to a set slice level;
   a step of generating a verification signal for determining header mask regions by using the first and second header detection signals; and
   a step of detecting header regions by counting the number of PLL-wobble signals using the verification signal as the reference signal;
   wherein the header mask regions hold the PLL-wobble signals at a previous value in "ON" sections.

* * * * *